United States Patent [19]

Reder

[11] Patent Number: 5,027,066
[45] Date of Patent: Jun. 25, 1991

[54] INDUCTIVE DISTANCE SENSOR USING A PARTICULAR OSCILLATOR IMPEDANCE RATIO

[75] Inventor: Winfried Reder, Marktheidenfeld, Fed. Rep. of Germany

[73] Assignee: Mannesmann Rexroth GmbH, Lohr, Fed. Rep. of Germany

[21] Appl. No.: 474,505

[22] Filed: Feb. 2, 1990

[30] Foreign Application Priority Data

Feb. 3, 1989 [DE] Fed. Rep. of Germany ....... 3903278

[51] Int. Cl.$^5$ .............................................. G01B 7/14
[52] U.S. Cl. .............................................. 324/207.16
[58] Field of Search ....................... 324/207.16, 207.17, 324/207.18, 207.19, 207.14

[56] References Cited

U.S. PATENT DOCUMENTS

| 3,456,132 | 7/1969 | Dechelotte | 324/207.18 X |
|---|---|---|---|
| 4,112,365 | 9/1978 | Larson et al. | 324/207.16 X |
| 4,160,204 | 7/1979 | Holmgren et al. | 324/207.16 |
| 4,187,462 | 2/1980 | Haker et al. | 324/207.17 X |
| 4,492,925 | 1/1985 | Kammerer et al. | 324/207.17 X |
| 4,513,257 | 4/1985 | Miyamoto et al. | |
| 4,550,252 | 10/1985 | Tee | 324/207.18 X |
| 4,560,929 | 12/1985 | Melnyk | 324/207.16 |
| 4,637,265 | 1/1987 | Fiori, Jr. | 324/207.17 X |
| 4,719,362 | 1/1988 | Nest et al. | 324/207.17 X |

FOREIGN PATENT DOCUMENTS

| 1773916 | 12/1971 | Fed. Rep. of Germany . |
|---|---|---|
| 2550427 | 5/1976 | Fed. Rep. of Germany . |
| 2834763 | 2/1980 | Fed. Rep. of Germany . |
| 2935539 | 3/1980 | Fed. Rep. of Germany . |
| 2919983 | 11/1980 | Fed. Rep. of Germany . |
| 3004133 | 8/1981 | Fed. Rep. of Germany . |
| 3611862 | 10/1987 | Fed. Rep. of Germany . |
| 2170912 | 8/1986 | United Kingdom . |

Primary Examiner—Kenneth Wieder
Assistant Examiner—Warren S. Edmonds
Attorney, Agent, or Firm—Cushman, Darby & Cushman

[57] ABSTRACT

An inductive distance detecting circuit has a control circuit, an inductive distance detector, and an evaluation circuit (demodulator). The control circuit is an LC-oscillator which comprises a parallel circuit having a capacitor and which uses coils of the inductive distance detector, connected in series. An operational amplifier uses the capacitor and coil to determine distance.

3 Claims, 4 Drawing Sheets

INDUCTIVE DISTANCE SENSOR USING A PARTICULAR OSCILLATOR IMPEDANCE RATIO

TECHNICAL FIELD

This invention relates generally to an inductive sensor and, more particularly, to an inductive distance detecting device.

BACKGROUND ART

Inductive metering devices are known, for instance, disclosed in the book "Der Hydrauliktrainer, Volume 2, Proportional- und Servoventiltechnik" of Mannesmann Rexroth GmbH, Lohr am Main on page D7. A distance detecting device of the type shown in this book is disclosed in FIG. 1 below. Another known design of a distance detecting device is further shown in FIG. 2 below.

Said known distance detecting devices require a substantial number of components with the consequence, that the space requirement on an electronic card are undesireably large. Moreover, said known distance detecting devices require a relatively large amount of power with the inherent disadvantages. Finally, the sinus voltage at into the distance detecting device has a large distortion factor and therefore a correspondingly large distortion factor when occur at the output of the evaluation circuit (a demodulator) which is arranged following the detecting device.

DISCLOSURE OF INVENTION

It is an object of the present invention to overcome one or more of the problems set forth above. It is a further object to provide an inductive distance detecting device such, that said device uses a low amount of power. In accordance with another object the preciseness of the distance measuring device and the quality of the measurement should be improved.

In one aspect of the present invention a distance detecting device is provided which makes use of the inductivity of an inductive distance detector, i.e. of an inductivity which is present anyway, for feeding said inductive distance detecting device.

In a second aspect of the invention an inductive distance detecting device or an inductive sensor comprises inductivity means in the form of coil means as ell as a metering armature which is movable with respect to said coil means. Also, a control circuit and an invaliation circuit are provided. The control circuit uses an LC-oscillator which is known per se. Said LC-oscillator is realized by making use of the inductivity or coil means of the inductive distance detector.

When using a distance detecting device having a primary and a secondary coil it is preferred to use the primary coil for forming together with a condensor (a capacity) the oscillated circuit of the LC-oscillator. Alternatively, if an inductive distance detecting device is used which does not feature a primary coil, the coil means of the distance detecting device is used together with a condensor for forming the LC-oscillating circuit.

Preferred embodiments of the invention are disclosed in the claims.

BRIEF DESCRIPTION OF THE DRAWINGS

For a better understanding of the present invention, reference may be made to the accompanying drawing, in which

In FIG. 1 a prior art inductive distance detector 1 is shown together with its control and evaluation circuit 2 so as to form together a distance detecting device 3. The distance detecting arrangement 3 provides at its output 14 an electrical signal which is proportional to a distance "s" through which a valve spool (or any other element) 18 is moved.

Figure 1:
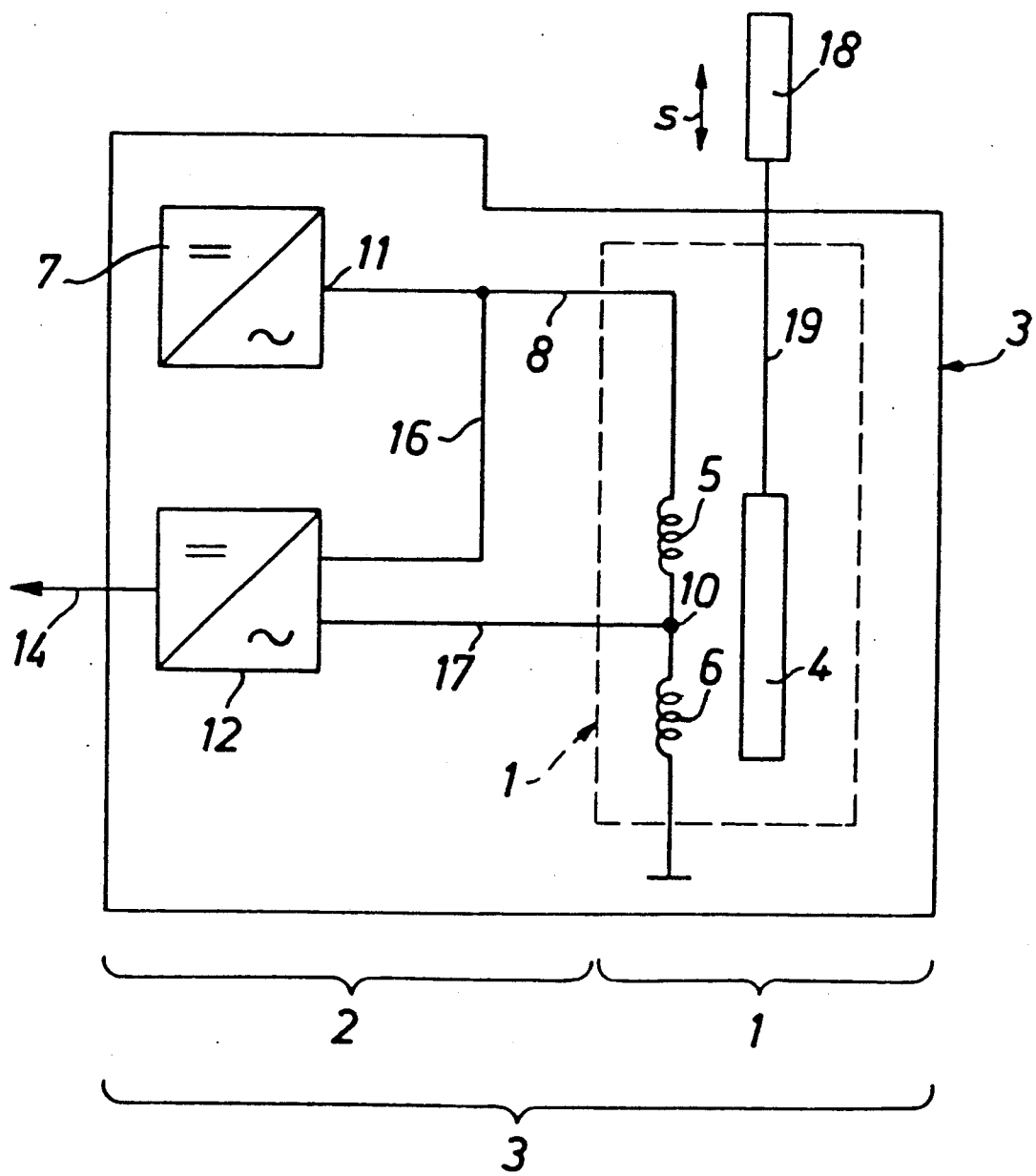
FIG. 1 is a schematic arrangement of an inductive distance detecting device of the prior art.

The inductive distance detector 1 comprises a cylindrical receiving body (which is not shown) for a metering armature 4. The metering armature 4 comprises a ferromagnetic core by means of which the metering armature 4 is inserted into the receiving body. Mounted to the metering armature 4 is a valve spool 18 (or a similar element) by means of a rod 19. Said valve spool 18 is movable, and the distance covered by the movement is (as mentioned) referred to as "s". The distance detector 1 comprises also two coils (or inductivities) 4 and 6 which are connected in series. The inductivity of said coils 4 and 6 is changed due to the movement of the metering armature 4.

The two coils 5 and 6 are connected together such that an inductive half bridge is formed. Coil 5 is connected via a conduit 8 with an oscillator 7 of the control and evaluation 2. The free end of coil 6 is connected to ground, and both coils 5 and 6 are connected together at connecting point 10. Connecting point 10 is also referred to as metering point 10 and is connected by a convid 17 to one input of a demodulator 12. Another input of the demodulator 12 is connected by a conduit 16 to said conduit 8.

The inductive distance detector 1 is supplied by the oscillator 7 with a voltage which frequency comprises a carrier frequency of 2.5 kHz (kilocycles). Depending on the position of the metering armature 4 the carrier frequency voltage occuring at the metering point 10 will have a different amplitude inasmuch as a movement of the metering armature 4 causes a change of the inductivity of the coils 5 and 6. The demodulator 12 changes the level of said output amplitude at the metering point into a corresponding dc voltage signal outputted at output 14. Said dc voltage signal and output 14 is representative for the distance "s".

Figure 2:
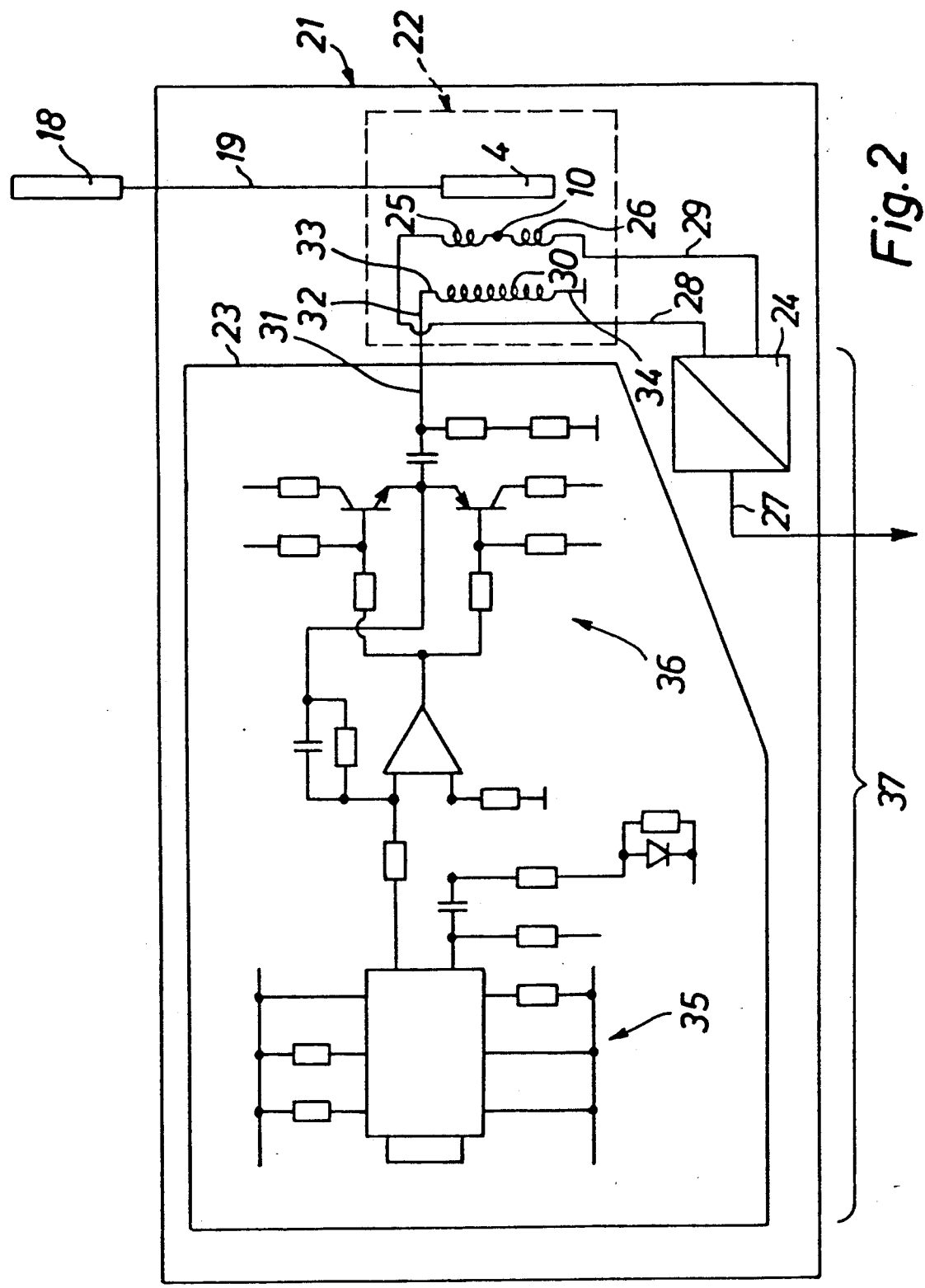
FIG. 2 is a circuit arrangement of another realisation of a distance detecting device of the prior art.

FIG. 2 is a known, more detailed representation of the circuit of FIG. 1. Again, here the distance detector 22 comprises a metering armature 4 which is connected via a rod 19 with a valve spool 18. That metering armature 4 cooperates to coils 24 and 26, respectively. The connecting point of said coils 24 and 26 is again referred to by reference numeral 10.

A demodulator (forming the evaluation circuit) is referred to by reference numeral 24 and is connected with an input via a conduit 28 to one end of coil 25 and via a conduit 29 to an end of coil 26. The output of the demodulator 24 is referred to by 27 and corresponds to the output 13 in FIG. 1. The oscillator is referred to by reference numeral 23 and comprises, in a known manner, the oscillator circuit 35 as such, as well as an amplifier 36. The output 31 of the oscillator 23 is connected via a conduit 32 to a primary coil 30. The other end of the primary coil 30 is grounded. The primary coil 30 serves for feeding the oscillator energy into coils 25 and 26 which act as secondary coils.

In FIG. 2 the distance detecting device is generally referred to by reference numeral 21 and the distance detector as such is referred to by reference numeral 22. The evaluation and control circuit is referred to by reference numeral 36 and comprises the oscillator 23 as an control circuit, and the demodulator 24 as an evaluation circuit.

Figure 3:
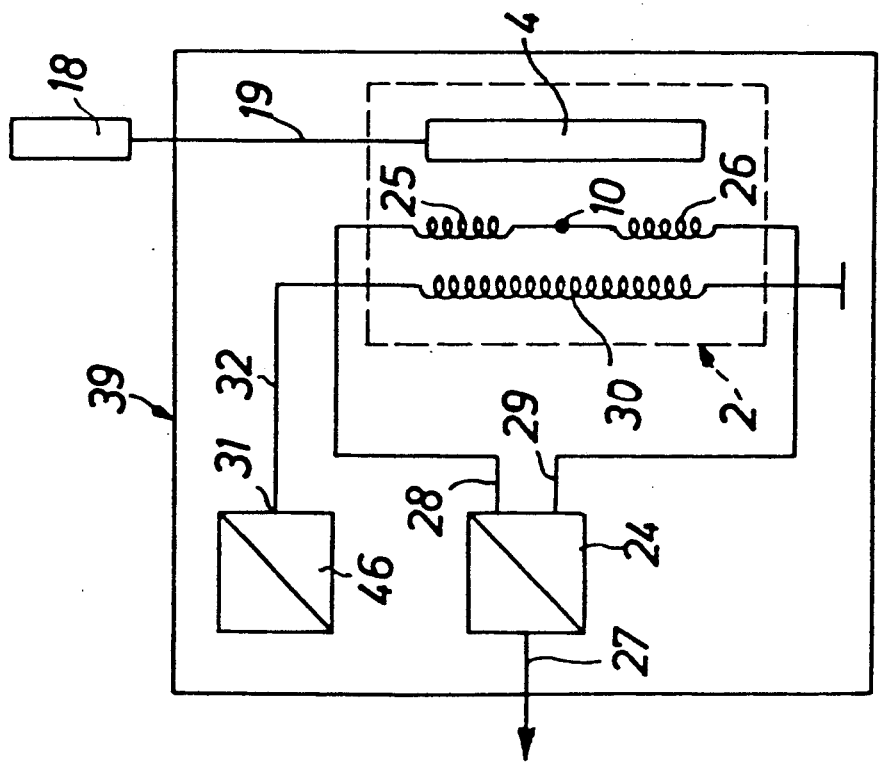
FIG. 3 is a generalizing representation of the circuit of FIG. 2.

FIG. 3 is a generalisation of the distance detecting device 21 of FIG. 2. The oscillator 46 again feeds into the primary coil 30.

The distance detecting device 21 of FIG. 2 and the distance detecting device 39 of FIG. 3 derived from the device of FIG. 2, requires a large number of components and additional space on the respective electronic card. Moreover, the electrical power which needs to be fed into the distance detector 22 is relatively large and can be e.g. in the area of 200 mA. Moreover, the sinus voltage fed into said distance detecting device of the prior art has a large distortion factor with the consequence that the proportion of noise at the output of the evaluation circuit (demodulator 24) becomes large.

Figure 4:
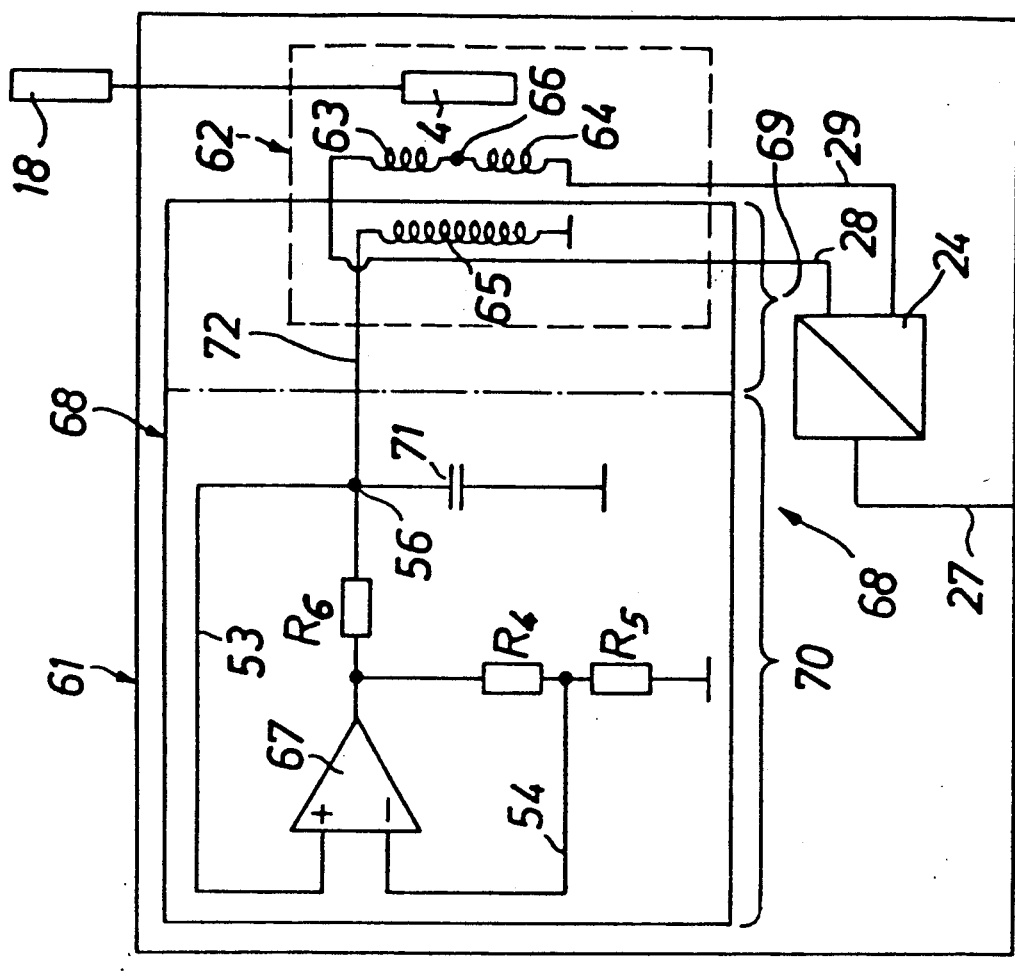
FIG. 4 is a circuit arrangement of a first embodiment of a distance detecting device of the invention.

FIG. 4 discloses a distance detecting device 61 of the invention comprising in accordance with the invention an oscillator 68 which serves as a control circuit for an inductive distance detector 62. The evaluation circuit in FIG. 4 is again a demodulator 24, the inputs of which are connected via conduits 28 and 29, respectively with the two ends of the series connection of coils 63 and 64. The output of said demodulator 24 is again referred to by reference numeral 27.

Again, a metering armature 4 as well as valve spool 18 are shown.

In accordance with the invention the oscillator 68 is designed such that the inductivity of the primary coil 65 of the inductive distance detector (sensor) 62 is used.

Thus, the oscillator 68 can, for all practical purposes, be considered to comprise two parts, the oscillator part 70 and the oscillator part 69 with the oscillator part 69 comprising the primary coil 65, or using the same.

Due to the fact that a condensor (capacity) 71 is arranged in parallel to the inductivity of the primary coil 65, a LC-oscillating circuit is created. An operational amplifier 67 makes sure (as is known per se) together with a defined circuit arrangement of resistances R4, R5 and R6, that the LC- oscillating circuit oscillates with a natural frequency. Thus, to sustain the oscillation the following relationship has to be maintained:

$$\frac{R4}{R5} > \frac{R6}{Z}$$

Z refer to the AC resistance of the parallel arrangement of condensor 71 and primary coil 65.

Due to the fact that the arrangement of FIG. 4 requires, for all practical purposes, only passive components, less power is required for operating the distance detecting arrangements 61 of FIG. 4. It is only necessary to supply power required for sustaining the oscillation. This means in practice that the power consumption is very low, for example, in the range of 1-2 mA.

Figure 5:
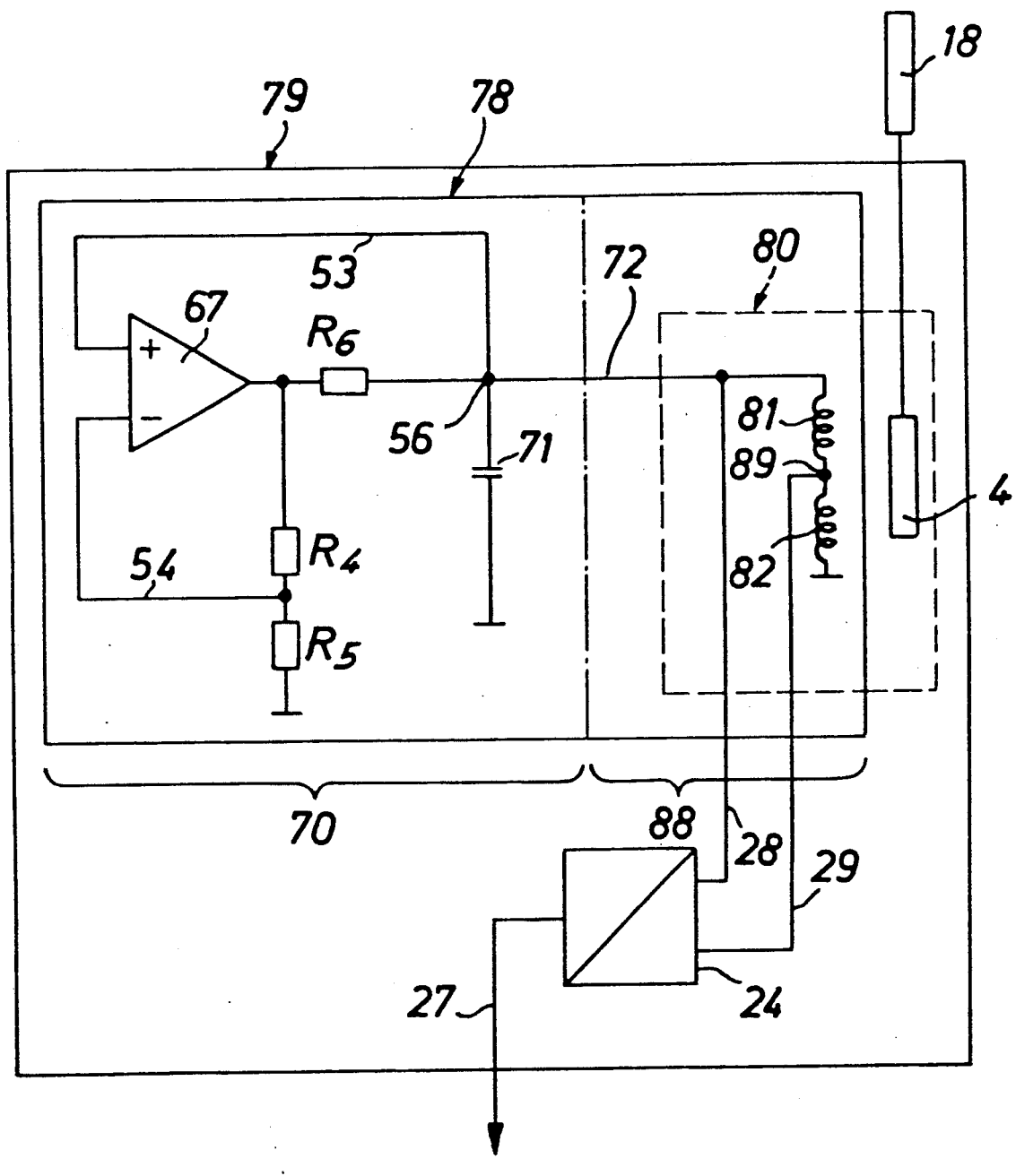
FIG. 5 is a second embodiment of a distance detecting device of the invention.

FIG. 5 discloses a distance detecting device 79 which is a modification of the distance detecting device 61 of FIG. 4.

In contrast to FIG. 4 numeral primary coil is provided for the distance detecting device 79, and the oscillator 78 comprises, besides a first oscillator portion 70 (as in FIG. 4), a second oscillator portion 88, which comprises both coils 81 and 82 arranged in series. The inductive distance detector is referred to by reference numeral 80 and also comprises the coils 81 and 82 as well as the metering armature 4 which is connected to the valve spool 18. The connecting point or output of the oscillator portion 70 is connected by a conduit 72 to an end of the coil 81. Further, the demodulator 24 is connected at its input side by a conduit 28 with conduit 72 and thus with the coil 81, and further by a conduit 29 with the connecting or metering point 89, where the coils 81, 82 are connected.

In the embodiment of FIG. 5 the condensor (capacity) 71 of the serial connected coils 81 and 82 form a LC - oscillating circuit.

The circuit of the invention shown in FIG. 4 is preferably used in the form of an integrated electronic circuit with the oscillator portions 70 and 69 being located closely to each other. However, even if provided on a card, a large length of a conduit has a substantially smaller influence than is true for the customary circuit arrangement of FIG. 2.

The oscillator design of the invention can be used for longitudinal as well as rotary measurement (LVDT and RVDT measurements).

I claim:
1. An inductive position detecting device comprising:
   a primary coil receiving an oscillating signal;
   at least one secondary coil in which a signal is induced by said primary coil to detect a distance;
   a control circuit in the form of an LC oscillator using said primary coil for oscillating and the excitation of said at least one secondary coil; and
   an evaluation circuit for supplying an output signal which is representative of the distance; and wherein said control circuit includes an operational amplifier, together with a defined circuit arrangement of resistances, including a first resistance R4 between its output and input, a second resistance R5 between said first resistance and ground, and a third resistance R6 between said output and said LC oscillator, which satisfy the following term:

$$\frac{R4}{R5} > \frac{R6}{Z}$$

wherein Z is an AC-resistance of the LC-resonance circuit formed by the parallel arrangement of a capacitor and an inductance including said coil.

2. The arrangement of claim 1 wherein there are two secondary coils.

3. The arrangement of claim 2 wherein said secondary coils are arranged in series.

* * * * *